United States Patent [19]

Rawicz et al.

[11] 4,446,409
[45] May 1, 1984

[54] ELECTRONIC CONTROLLER APPARATUS

[75] Inventors: Harris C. Rawicz, Bridgewater;
Vincent J. Rizzo, Basking Ridge;
William R. Buntemeyer, Washington,
all of N.J.

[73] Assignee: Lockheed Electronics Co., Inc.,
Plainfield, N.J.

[21] Appl. No.: 360,789

[22] Filed: Mar. 22, 1982

[51] Int. Cl.$^3$ ........................................ G05D 23/275
[52] U.S. Cl. ................................. 318/632; 318/561;
318/615; 318/327
[58] Field of Search ............... 318/636, 615, 616, 617,
318/561, 565, 327, 632

[56] References Cited

U.S. PATENT DOCUMENTS

| | | | |
|---|---|---|---|
| 4,213,175 | 7/1980 | Kurihara | 318/561 |
| 4,266,168 | 5/1983 | Andersen | 318/636 X |
| 4,366,422 | 12/1982 | Rhodes | 318/616 X |
| 4,368,510 | 1/1983 | Anderson | 318/561 X |

Primary Examiner—B. Dobeck

[57] ABSTRACT

An improved electronic control system employs a primary servomechanism loop which includes an error signalling difference node and a stability compensating forward gain/drive element intermediate an input command signal source and a controlled output element. A second, similar image feed back loop is operative upon a simulated representation of the controlled output element or plant, and is exercised by the input command source. The error node in the second image loop generates a loop error signal responsive to the difference between the input command and the simulated, predicted response for the controlled element.

In accordance with the present invention, the two error signals produced by the actual and image feed back loops are compared and generate a supplementary feed back signal which is summed with the plant-driving signal applied to the controlled element. Accordingly, the structure above considered operates to vitiate any difference between the error signals in the actual and image loops, thereby forcing the response of the controlled element to track the desired, predicted response therefor in the image loop notwithstanding any degredation experienced by the controlled plant.

5 Claims, 5 Drawing Figures

ELECTRONIC CONTROLLER APPARATUS

DISCLOSURE OF INVENTION

This invention relates to electronic apparatus and, more specifically, to improved electronic controlled or servo-mechanism apparatus.

Feed back or servo-mechanism control apparatus per se represents an electronic assemblage well known and very widely employed. Thus, for example, considering the elements within the dashed enclosure 10 of FIG. 1, an input command source 12 provides command signals to control a load, e.g., as generically represented by an analog plant 20. That is, it is desired to have some controlled structure ("plant 20") respond in accordance with electronic commands issued by the source 12. As just one example among many, the control member ("plant") may be the speed of a motor having a shaft which will turn more or less rapidly as the output command of the source 12 increases or decreases. Specific implementations for the plant 20 are virtually endless for both civilian and military applications. The per se conventional feed back structure 10 includes a subtractor or error node 16 which provides an output error signal $E_a$ representing the difference between the input command and the controlled response parameter (e.g., motor speed for the example given above). A forward gain/drive path, compensated to insure loop stability, represented by compensation network 18, drives the controlled plant 20 responsive to the node 16-measured actual error in a direction to overcome the error, all as long since well understood.

However, such prior art equipment has certain deficiencies. Thus, for example, the properties of the controlled element/plant 20 may change with time. By way of typical illustration, motor brushes or windings may progressively become fouled, load backlash may increase, system friction may vary and/or the like. Accordingly, the output response to input commands may vary (degrade) with plant aging or changes.

It is an object of the present invention to provide improved electronic control apparatus.

More specifically, it is an object of the present invention to provide improved electronic control apparatus, employing multiple feed back loops, which maintains the response of an output plant, i.e., the response of a controlled element constant notwithstanding physical or electronic changes in the controlled plant.

It is yet another object of the present invention to provide improved control apparatus which does not require extra system signals; and which maintains a desired control response characteristic for an output element notwithstanding changes in the characteristics of such element.

The above and other objects and features of the present invention are realized in a specific, illustrative improved electronic control system, which employs a primary servomechanism loop having an error signalling difference node and a stability compensating forward gain/drive element connected intermediate an input command signal source and a controlled output element. A second, similar image feed back loop is operative upon a simulation of the controlled output element or plant. The error node in the second, or image loop (also exercised responsive to input commands supplied by the source thereof) generates a loop error signal responsive to the difference between the input command and the simulated, predicted response for the controlled element.

In accordance with the present invention, the two error signals produced by the actual and image feed back loops are compared and generate an additional feed back signal which is summed with the primary loop generated plant-driving signal applied to the controlled element. Accordingly, the structure above considered operates to vitiate any difference between the error signals in the actual and image loops, thereby forcing the response of the controlled element to track the desired, predicted response in the image loop notwithstanding initial or developed difference between the controlled plant and the simulation thereof.

The above and other features and advantages of the present invention will become more clear from the following detailed description of a specific, illustrative embodiment thereof, presented hereinbelow in conjunction with the accompanying drawing, in which.

Figure 1:
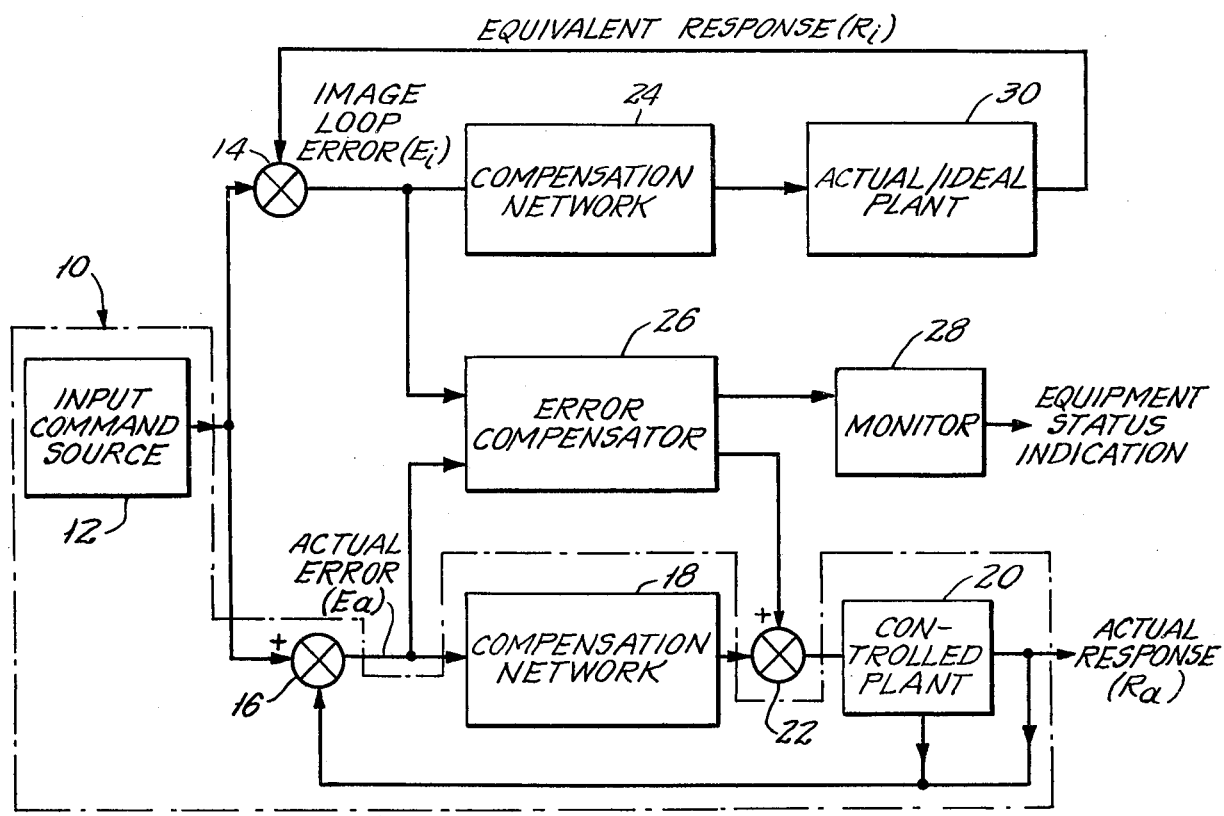
FIG. 1 is a block diagram of improved control apparatus incorporating the principles of the present invention.

Turning now to the drawing and more particularly to FIG. 1, there is shown in block diagram form improved feed back apparatus for controlling the output of any type of electrically controlled element 20—generically labeled as "controlled plant". The controlled element may be analog or digital; and may be of any form well known to those skilled in the art. Electronic or electromagnetic apparatus controlled by electronic command signals are a very broad class of structure, and any attempt to definitively encompass all such elements would be unbounded. Common such apparatus are electronic motors, antennas, missiles, weaponry, control surface on moving vehicles, and so forth. It will be assumed that the controlled "plant" is a motor for convenience of expression and without limitation.

The FIG. 1 apparatus includes a first, or primary servomechanism loop 10 above discussed. To briefly review, the controlled plant 20, i.e., the motor, performs in accordance with the instantaneous output of an input command signal source 12 under control of a difference circuit, or node 16 and a compensated forward gain/drive element 18, e.g., a compensated amplifier. As per se well known for feed back structure, the actual response of the controlled plant 20, e.g., motor speed as reported by a tachometer, is compared (subtracted) in the subtracting node 16 with the electronic input command from source 12. The resulting actual difference, or primary loop error signal $E_a$, is then amplified in forward element 18 and applied to the controlled element 20 in a polarity to obviate the error (difference). That is the conventional operation of this or substantially any feed back, servo loop.

As above noted, however, loops having the servomechanism structure considered to this point in text exhibit different responses as and when the characteristics of the plant 20 change. In many instances, that is not desirable. Accordingly, pursuant to the principles of the present invention, the FIG. 1 apparatus includes an image feed back loop which electronically simulates the primary loop bounded within rectangular 10 in FIG. 1. The image loop includes an element 30 which simulates the actual (or, alternatively, ideal as below discussed) response of the analog plant 20. The actual plant 30 simulator may be electronic; or alternatively, may be an analog or digital computer simulator, each well known to those skilled in the art. Indeed, the entire assembly of elements discussed herein may include one or many programmed digital computer(s)—other than the controlled plant 20.

A subtractor or error node 14 produces an image loop error signal $E_i$ respresenting the difference between the then applied input command supplied by the source 12 thereof and the response simulated by the actual plant simulator 30. The error signal is amplified by a forward gain compensated element 24 having a characteristic comparable to that of the primary loop driver element 18. Accordingly, the image loop continually operates in the manner in which the primary loop 10 should operate and, of course, is not subject to aging or other characteristic-changing processes.

An error compensator network 26 compares (initially, as by subtraction) the actual and image loop error signals $E_a$ and $E_i$. Any difference between these error signals is of course the result of a difference between the simulated plant 30 and the actual plant 20. This error signal is amplified and compensated in structure 26, and summed with the output of the compensation forward gain element 18 of the primary loop in summing node 22. The output of the summing node 22 is employed to drive the controlled element in the analog plant 20.

One fundamental observation is made at this point. To the extent that any difference exists between the actual error signal $E_a$ and desired or image error signal $E_i$, it is overcome by the action of the secondary feed back path elements 26 and 22. That feed back path acts to force the difference between the error signals in the primary and image loops to a substantially null. In doing so, it will be apparent that the actual response for the real plant 20 is forced to substantial identity with the response for the comparable simulated actual plant 30. Accordingly, the response of the controlled element in plant 20, e.g., the speed of the motor for the assumed application, is constantly maintained in proper form, matching the output of the plant simulator 30 notwithstanding any changes in the properties or response characteristic of the controlled element 20. Accordingly, the fundamental purposes of the instant invention are achieved.

As a further matter, the instantaneous functioning of the error compensator element 26 provides a measure of the actual changes present in the analog plant 20. These are detected and processed in a monitor 28, and provide an equipment status output indication. Thus, an equipment operator is apprised of those changes undergone in the controlled element 20 for correction, if desired.

Figure 2:
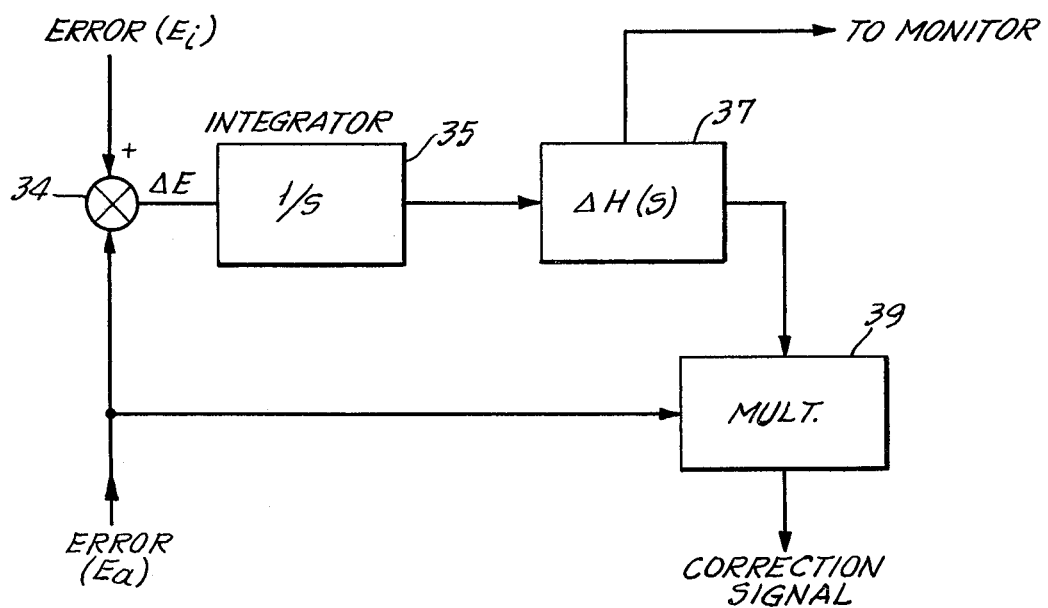
FIG. 2 is a block diagram of error compensator apparatus 26 generally shown in FIG. 1.

A specific implementation of the error compensator 26 is shown in FIG. 2 and includes a subtractor or error node 34 for producing an inter-loop differential error signal $\Delta E$ representing the difference between the error signal of the actual feed back loop $E_a$ and the simulation loop error signal $E_i$. The differential error signal is integrated in an integrator 35 and passed through a compensation forward gain element 37 of any desired kind to control a particular plant 20 actuator, its transform response being shown as $\Delta H$. In its simplest form $\Delta H$ will simply be a compensated amplifier with a response characteristic to assure loop stability. The output of the forward gain element 37 is multiplied with the actual error signal $E_a$ to provide the correction signal supplied to the primary loop summing node 22. The integrator and forward gain element 37 effectively provide steady state correction to overcome changes in the analog plant 20 vis-a-vis the simulated actual plant 30. The lower signal path comprising the error signal $E_a$ and multiplier 39 provides transient response correction.

Figure 3:
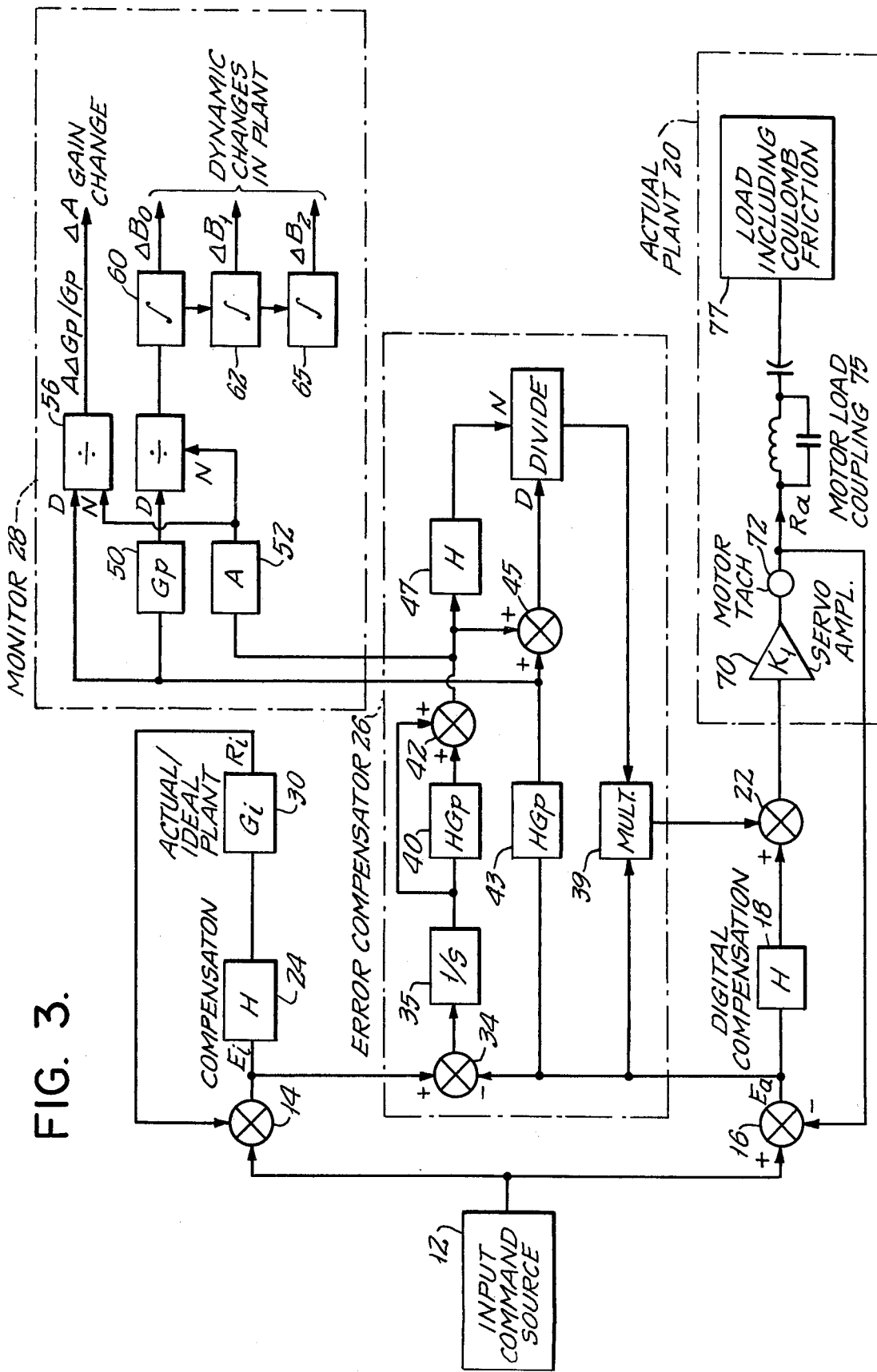
FIG. 3 is a block diagram of specific electronic control apparatus, corresponding to that shown in FIG. 1, applicable to a particular assumed implementation of a controlled plant 20.

Turning now to FIG. 3, there is shown in block diagram form a particular implementation for the elements more generally shown in FIG. 1 for an assumed actual plant 20 comprising a servo amplifier 70 and motor/tachometer 72 which drives a load 77 via a motor load coupling 75 characterized by the usual backlash and damping elements. The transform for the assumed plant, again per se well known, is given by $G_p$. The transform of the forward gain element 18 (and also 24)—many forms of which are per se well known, is represented by the transform H. Finally, the desired, actual, simulated plant 30 exhibits transform $G_i$ (which may equal the designed state of $G_p$). FIG. 3 depicts a particular system implementation for controlling the particular assumed plant 20, and includes one usable form of error compensator 26 wherein summing nodes 42 and 45 are represented in usual form. Like or functionally corresponding elements in FIGS. 1 and 3 are represented by like reference numerals. The transform of the correction applied in FIG. 3 is given by:

$$\frac{\frac{H(E_i - E_a)(1 + HG_p)}{S}}{E_a HG_p + \frac{H(E_i - E_a)(1 + HG_p)}{S}}$$

As generally discussed above with respect to FIG. 1, the apparatus of FIG. 3 operates to force the output of tachometer 72 in plant 20 (and thereby also the speed of the command-controlled motor) to follow the desired speed present at the output of the simulation plant 30 of the image feed back loop.

A particular implementation for the monitor circuitry 28 is also shown in FIG. 3. Element 52 is an amplifier of gain A and elements 60, 62 and 65 are cascaded integrators. As used in FIG. 3, the letters "D" and "N" signify inputs to divider circuits and represent a denominator and numerator, respectively. The output of divider element 56 represents plant gain change, and the outputs of the cascaded integrators 60, 62 and 65 respectively represent dynamic changes in co-efficients of the polynomial denominator in the mathematical transform space for the controlled plant, i.e., represent changes in the "B" coefficients when the plant 20 transform in pertinent part is expressed as:

$$\frac{A}{B_o + B_1 S + B_2 S^2}$$

Figure 5:
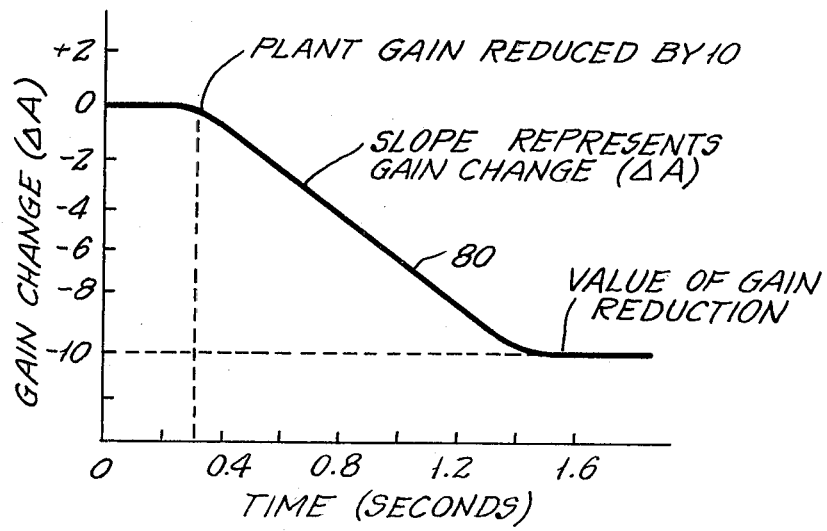
FIG. 5 is a graph depicting a controlled element gain change reporting signal present at the output of a summing network 56 shown in FIG. 3.

To illustrate monitor 28 functioning, FIG. 5 includes an output curve 80, corresponding to the output of divider element 56 responsive to a plant 20 gain reduction by a factor of ten, i.e., provides an output signal which changes to signal that the plant 20 gain has been reduced by ten.

Figure 4:
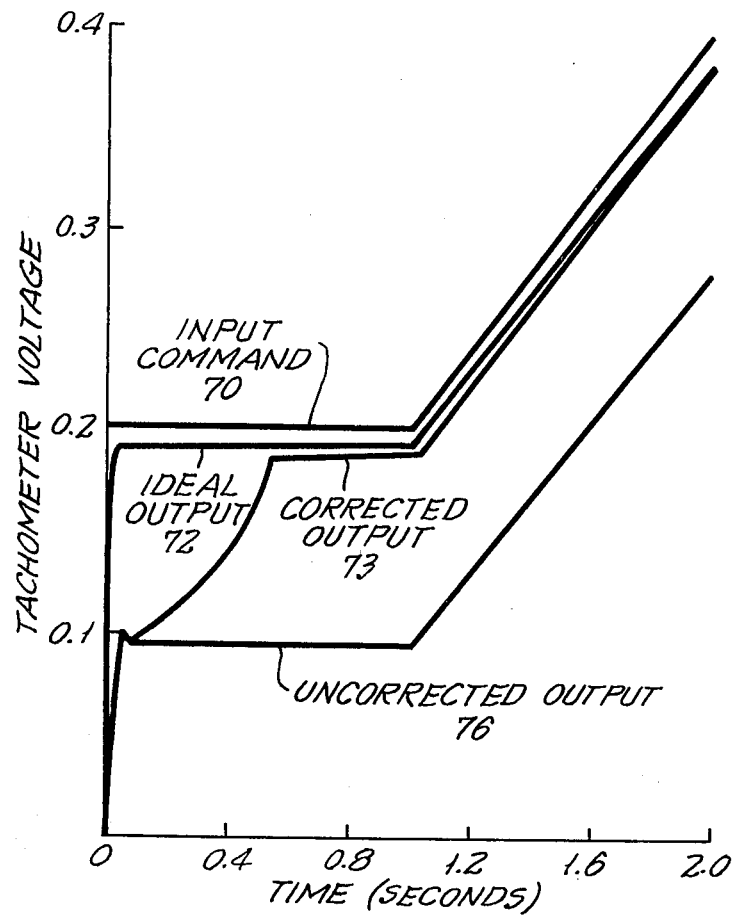
FIG. 4 is a set of curves showing performance responses for apparatus shown in FIG. 1—with and without correction.

Finally, FIG. 4 illustrates the response of the FIG. 1/FIG. 3 system to an applied input command 70. The ideal servo response is shown by a curve 72 and the system of the instant invention exhibits a corrected response indicated by the curve 73. Correspondingly, curve 76 corresponds to an uncorrected response equivalent only to the primary loop 10 shown in FIG. 1.

The above discussion has assumed that the image feed back loop included a simulation of the actual plant 20. That is, either by electronic circuit or data simulation, element 30 represented the plant 20 in its initial or correct, actual form. Thus, notwithstanding real changes (usually deleterious) in the response characteristic of the actual plant 20, its output response would be continuously forced to perform in its initial, correct design state. However, the simulator 30 may simulate something other than the initial actual plant 20, e.g., may simulate the plant in an ideal form free of one or more undesired practical constraints. In such a state, the actual performance of the real plant 20 would follow an ideal, possibly better than actual, response.

The above described electronic circuitry is presented merely for purposes of illustration and not limitation,. Numerous modifications and adaptations thereof will be readily apparent to those skilled in the art without departing from the spirit and scope of the present invention.

What is claimed is:

1. In combination in apparatus for controlling a controlled element; primary feed back loop means including feed back signal supplying means for supplying a signal representing the state of the controlled element, an input signal source, first difference means having inputs connected to said input signal source and to said feed back signal supplying means for providing a primary loop error signal, and forward gain means responsive to said primary loop error signal generated by said first difference means for driving the controlled element; image feed back loop means including controlled element simulating means, second difference means having inputs connected to said input signal source and to an output of said simulating means for providing an image loop error signal, and second forward gain means connecting said second difference means and said simulating means; and third difference means, having inputs connected to said first and second difference means for augmenting the drive applied to the controlled element responsive to the difference between said error signals in said primary and image feed back loop means, wherein said third difference means includes integrating steady state means responsive to the error signal difference in said primary and image feed back loop means, and multiplier means for multiplying the output of said steady state means and said primary feed back loop error signal determined by said first difference means.

2. A combination as in claim 1, further comprising a controlled element connected to said forward gain means.

3. A combination as in claims 1 or 2 wherein said simulator means simulates the actual response of the controlled load.

4. A combination as in claims 1 or 2 wherein said simulator means simulates an ideal response of the controlled load.

5. A combination as in claims 1 or 2 further comprising change monitoring means connected to said third difference means.

* * * * *